Dec. 29, 1953
J. R. HOWLAND
2,664,461
SUBSCRIBER RECEIVER ENUNCIATOR
Filed May 10, 1950
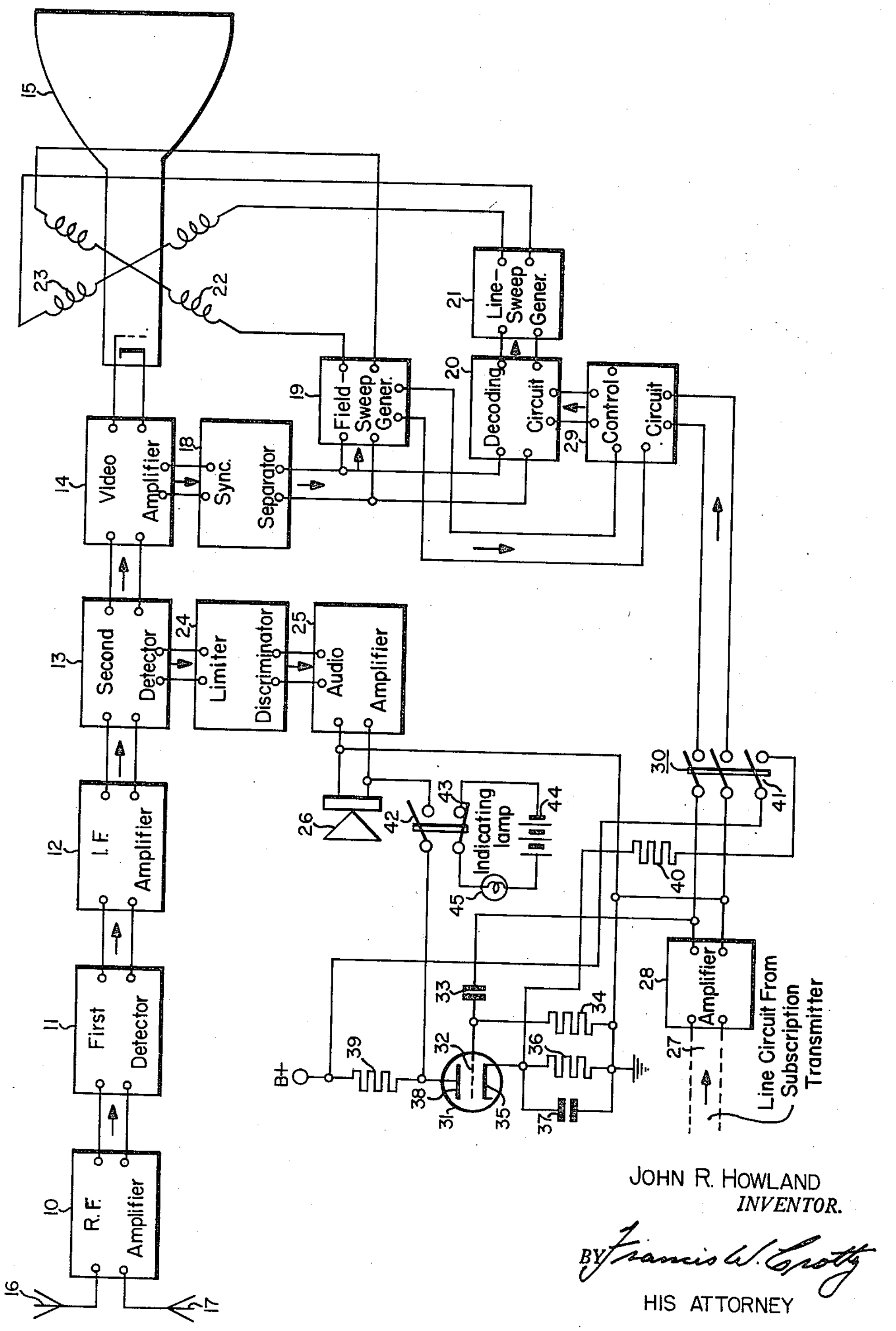
JOHN R. HOWLAND
*INVENTOR.*
BY Francis W. Crotty
HIS ATTORNEY Patented Dec. 29, 1953

2,664,461

UNITED STATES PATENT OFFICE 2,664,461

SUBSCRIBER RECEIVER ENUNCIATOR

John R. Howland, Lake Forest, Ill., assignor to Zenith Radio Corporation, a corporation of Illinois Application May 10, 1950, Serial No. 161,080

3 Claims. (Cl. 178—5.1)

This invention relates to subscription signalling systems in which a coded signal is transmitted over one channel and a key signal for decoding the coded signal is transmitted to subscriber receivers over a second channel, preferably a line circuit. More specifically, this invention relates to a signalling device or enunciator which is adapted to be connected into a subscriber receiver for indicating under certain conditions the receipt for the key signal over the line circuit.

Subscription signalling systems of the type under consideration are disclosed in Patent 2,510,046, filed in the name of Ellett et al., and issued May 30, 1950, entitled "Radio-Wire Signalling System" and Patent 2,547,598, filed in the name of Roschke and issued on April 3, 1951, entitled "Image Transmission System," both of which are assigned to the present assignee. The receiver arrangements of these systems are constructed to utilize standard uncoded television signals as well as coded subscription television signals. It is contemplated that a subscriber wishing to view a program transmitted by a coded subscription signal will call a central office and request that the appropriate key signal for decoding the subscription signal be disseminated to his receiver over the telephone circuit at the proper time. The subscriber may order the key signal some time during the day of the subscription broadcast well in advance of the time at which reception of the key signal is desired and, of course, it is possible that the subscriber may forget the program and may even forget that he has ordered the key signal required for enjoying the program. In fact, he may be utilizing his television receiver for the receipt of a standard uncoded television broadcast during the time of the subscription program for which he has ordered the key or decoding signal. Should this occur, the key signal is nevertheless supplied to the subscriber and he is charged therefor, even though he is deriving no benefit from the key signal.

The purpose of the present invention is to provide an enunciator which indicates the receipt of the key signal under such circumstances, preferably by an audible signal. This signal commences the moment that the key signal is supplied to the subscriber if his receiver is not tuned to the subscription broadcast, and continues until the receiver is tuned to receive the subscription program which the key signal is intended to decode.

It is, accordingly, an object of the present invention to provide a device for a subscriber receiver to indicate the receipt of a key signal during operating intervals in which the receiver is not conditioned to use the key signal for decoding a subscription broadcast.

The features of this invention which are believed to be new are set forth with particularity in the appended claims. The invention itself, however, together with further objects and advantages thereof may best be understood by reference to the following description when taken in conjunction with the accompanying drawing in which the single figure shows a preferred embodiment of the invention incorporated into a subscription type television receiver.

The subscription receiver illustrated is disclosed and described in detail in Patent 2,547,598 referred to above. However, it will be understood that the present invention may be incorporated into any type of subscription receiver which utilizes a separately received key signal to decode the coded subscription signal. Moreover, the various components of the subscription receiver are shown in block form since these components are either well known to the art or described in great detail in the Roschke patent and of themselves form no part of the present invention.

The receiver includes a radio-frequency amplifier 10 of one or more stages, this amplifier being connected to a first detector 11. The output terminals of detector 11 are connected to an intermediate-frequency amplifier 12 of any desired number of stages, and this amplifier is connected to a second detector 13. The second detector 13 is connected to a video amplifier 14 of any suitable number of stages, and the output terminals of amplifier 14 are connected to the input electrodes of an image-reproducing device 15 to control the intensity of the cathode ray therein in accordance with the video intelligence of a received television signal. The input terminals of radio-frequency amplifier 10 may be connected to any suitable antenna circuit 16, 17.

The video amplifier 14 may be connected to a synchronizing signal separator 18, and the separator connected to a field-sweep generator 19 and through a decoding circuit 20 to a line-sweep generator 21. The output terminals of generators 19 and 21 are connected respectively to the field- and line-deflection elements 22 and 23 of reproducing tube 15. The second detector 13 is connected to the sound channel of the receiver which includes a limiter-discriminator stage 24, an audio amplifier 25 and a sound-reproducing device 26.

The receiver is connected to a subscription transmitter or to any other source supplying the necessary decoding or key signal by means of a line circuit 27 which may conveniently be a telephone network. The line circuit 27 is connected to an amplifier 28, and the output terminals of this amplifier are connected to a control circuit 29 through a switching device 30. The control circuit 29 is also connected to field-sweep generator 19 to derive field-blanking pulses therefrom.

As fully described in the Roschke patent, the described subscription receiver is adapted to utilize a coded television signal of a particular type. This television signal is coded by altering the timing of the video components thereof relative to the line-synchronizing components during spaced operating intervals. The occurrence of these operating intervals is usually in accordance with a random coding schedule, and is indicated to the subscriber receiver by means of the key signal received over line circuit 27. It is convenient, for example, to have the amplitude-time characteristic of the key signal very precisely in accordance with the coding schedule of the transmitter.

The coded television signal may be intercepted by the antenna circuit 16, 17 and amplified in radio-frequency amplifier 10. Thence, it is heterodyned to the selected intermediate frequency of the receiver in first detector 11 and the resulting intermediate-frequency signal is amplified in amplifier 12 and detected in second detector 13. The composite video signal derived from the second detector is amplified in video amplifier 14 and applied to the input electrodes of tube 15 to modulate the cathode-ray beam thereof in well-known fashion.

The synchronizing components of the received television signal are separated from the video information in the synchronizing-signal separator and applied to field-sweep generator 19. This generator is synchronized by the field-synchronizing components of the received signal and controls the field scansion of tube 15. The synchronizing components are further applied to line-sweep generator 21 through decoding circuit 20 to control the line scansion of tube 15. As previously stated, during spaced intervals the timing of the video components of the received signal is varied relative to the line-synchronizing components by a preselected amount. The decoding circuit 20 is constructed to impart a time delay to the line-synchronizing components as applied to line-sweep generator 21 corresponding to this preselected amount. This decoding is under the control of unit 29 which, in turn, acts in response to field-blanking pulses derived from generator 19 and the key signal derived from amplifier 28. Since the key signal represents the coding schedule of the subscription transmitter, the decoding circuit is actuated during the appropriate spaced intervals to compensate for the variations in timing of the components of the received subscription signal. In this manner, the timing of the line scansion of reproducing tube 15 is altered by the correct amount and in the appropriate sense so that tube 15 may reproduce the intelligence contained in the received television signal. The receiver thus far described is completely disclosed in the above-identified Roschke patent, and since it forms no part of the present invention, a more detailed description thereof is deemed to be unnecessary.

In accordance with the principles of inter-carrier sound, now well known to the art, an inter-carrier signal frequency modulated with the sound components of the received television signal may be derived from second detector 31. This inter-carrier signal is applied to limiter discriminator 24 wherein the audio intelligence is recovered. This audio intelligence is amplified in audio amplifier 25 and reproduced in sound-reproducing device 26.

In order that the subscriber may be informed of the receipt of the key signal on line circuit 27, when his receiver is not conditioned to accept and use that signal, an enunciator circuit comprising an electron-discharge device 31 is included in the receiver. A control electrode 32 of device 31 is coupled to one of the output terminals of amplifier 28 through a capacitor 33, and is connected to ground through a grid-leak resistor 34, the other output terminal of amplifier 28 being also connected to ground. The cathode 35 of device 31 is connected to ground through a cathode resistor 36 shunted by a by-pass capacitor 37. The anode 38 of device 31 is connected to the positive terminal B+ of a source of unidirectional potential through a load resistor 39, and cathode 35 is also connected to this terminal through a resistor 40 series-connected with a switching device 41. The switching device 41 is mechanically coupled to the previously mentioned switching device 30 as shown. The anode 38 is connected to the sound-reproducing device 26 through a normally closed switch element 42.

The switch 30 is provided to disconnect the receiver from line circuit 27 during the reception of standard uncoded television signals. Obviously, while this switch is open the circuit from the line amplifier 28 to the control unit 29 is interrupted and the receiver cannot properly respond to a subscription broadcast. Should that condition exist during a particular subscription broadcast to which the receiving station has subscribed, a key signal is received over line circuit 27 and after amplification in amplifier 28 is translated by device 31 and delivered to sound-reproducing device 26. The key signal may be of an audible frequency so that an audible tone is developed indicating the receipt of the key signal to the subscriber. Upon this indication, the subscriber tunes the receiver to the subscription channel and closes switch 30 so that the key signal is delivered to control circuit 29 and the receiver is conditioned to decode the received subscription signal. Closure of switch 30 completes the circuit of the potentiometer arrangement of resistors 36 and 40 through switch element 41 and causes device 31 to be biased to a non-conductive state so that the key signal is no longer translated thereby and the corresponding tone in reproducing device 26 is discontinued.

Should a subscriber retain switch 30 in a closed position while utilizing his receiver for the reception of uncoded television signals, device 31 is biased to cut-off and no key-signal tone occurs in reproducing device 26 upon the reception of the key signal. However, under this condition there is no need for such indication because the key signal actuates decoding device 20 and causes distortion in the reproduction of the uncoded television signals. Consequently the subscriber is immediately aware of the fact that the key signal is being received and tunes his receiver to the subscription channel.

The situation may arise wherein the subscriber desires to tune his receiver to a standard uncoded television signal and yet does not wish to discontinue the key signal by a call to the central office. In order that the received key signal will have no effect on the uncoded signal, the operator must open switch 30. This, however, causes switch 41 to open and gives rise to a tone in reproducing device 26. To discontinue this tone, switch element 42 may be opened. It is desirable that switch 42 be mechanically coupled to a contact 43 which completes the circuit between a potential source 44 and an indicating lamp 45 whenever the switch 42 is open.

It is pointed out, that although the sound-reproducing device 26 may conveniently be used to produce an audible tone signal upon the receipt of the key signal, separate buzzers or other indicating means responsive to the key signal may be used when so desired.

This invention provides, therefore, a signalling device or enunciator for use in a subscription receiver of the type which utilizes a key received over one channel to decode a coded subscription signal received over a second channel. The enunciator of the present invention acts to inform a subscriber of the receipt of the key signal, and continues to operate until the receiver is tuned to the appropriate subscription signal at which time the enunciator circuit is disabled.

While a particular embodiment of the invention has been shown and described, modifications may be made and it is intended in the appended claims to cover all such modifications as fall within the true spirit and scope of the invention.

I claim:

1. In a receiver for utilizing a television signal coded in accordance with a prescribed coding schedule, an image-reproducing device, apparatus for receiving said television signal and for supplying said signal to said reproducing device, a decoding mechanism coupled to said apparatus having a quiescent condition and having an operating condition in which said mechanism responds to an applied key signal to effect decoding of the coded signal, and a key-signal source for supplying to said mechanism during intervals of reception of the coded television signal a key signal related to the coding schedule of the coded signal; an enunciator, a control circuit for actuating said enunciator, means for energizing said control circuit during any portion of the aforesaid reception intervals in which said decoding mechanism is in its quiescent condition; and means for disabling said control circuit when said decoding mechanism is in its operating condition.

2. In a receiver for utilizing a television signal coded in accordance with a prescribed coding schedule, an image-reproducing device, apparatus for receiving said television signal and for supplying said signal to said reproducing device, a decoding mechanism coupled to said apparatus responsive to an applied key signal to effect decoding of the coded signal, a key-signal source for producing during intervals of reception of the coded television signal a key signal related to the coding schedule of the coded signal, a switching device interposed between said source and said decoding mechanism operable from an open condition to a closed condition wherein said key signal from said source is supplied to said decoding mechanism, an enunciator, a control circuit for actuating said enunciator, means coupled to said switching device for energizing said control circuit during any portion of the aforesaid reception intervals in which said switching device is in its open condition; and means operable responsive to a closed condition of said switching device for disabling said control circuit when said decoding mechanism is in its operating condition.

3. In a receiver for utilizing a television signal coded in accordance with a prescribed coding schedule, an image-reproducing device, apparatus for receiving said television signal and for supplying said signal to said reproducing device, a decoding mechanism coupled to said apparatus having a quiescent condition and having an operating condition in which said mechanism responds to an applied key signal to effect decoding of the coded signal, a key-signal source for supplying to said mechanism during intervals of reception of the coded television signal a key signal related to the coding schedule of the coded signal, an enunciator, a control circuit for actuating said enunciator, means for coupling said control circuit to said key-signal source for energization thereby during any portion of the aforesaid reception intervals in which said decoding mechanism is in its quiescent condition; and means for disabling said control circuit when said decoding mechanism is in its operating condition.

JOHN R. HOWLAND.

References Cited in the file of this patent

UNITED STATES PATENTS

| Number | Name | Date |
|---|---|---|
| 2,007,399 | Koch | July 9, 1935 |
| 2,297,205 | Deserno | Sept. 29, 1942 |
| 2,330,241 | Roberts | Sept. 28, 1943 |
| 2,364,357 | Halstead | Dec. 5, 1944 |
| 2,510,046 | Ellett et al. | May 30, 1950 |
| 2,521,010 | Homrighous | Sept. 5, 1950 |